United States Patent [19]

Gillingham et al.

[11] Patent Number: 5,401,285
[45] Date of Patent: Mar. 28, 1995

[54] AIR CLEANER HAVING SCAVENGER ARRANGEMENT FOR PRECLEANER AND FILTER THEREOF

[75] Inventors: Gary R. Gillingham; Peter A. Betts, both of Prior Lake; Daniel T. Risch, Minneapolis; James C. Rothman, Burnsville; Fred H. Wahlquist, Bloomington, all of Minn.

[73] Assignee: Donaldson Company, Inc., Minneapolis, Minn.

[21] Appl. No.: 122,153

[22] Filed: Sep. 17, 1993

[51] Int. Cl.$^6$ ............................................. B01D 50/00
[52] U.S. Cl. ........................................ 55/284; 55/302; 55/321; 55/337; 55/343; 55/347; 55/385.3; 55/431; 55/466; 55/493
[58] Field of Search ................... 55/284, 302, 320, 321, 55/331, 337, 343, 347, 350.1, 385.3, 431, 466, 493; 95/280, 279

[56] References Cited

U.S. PATENT DOCUMENTS

| | | |
|---|---|---|
| 3,383,841 | 5/1968 | Olson et al. . |
| 3,393,498 | 7/1968 | Schoen ........................... 55/493 |
| 3,870,489 | 3/1975 | Shaddock ....................... 55/337 |
| 3,936,902 | 2/1976 | Shackleton et al. . |
| 4,009,011 | 2/1977 | Ross . |
| 4,127,397 | 11/1978 | O'Nan, Jr. et al. ............. 55/431 |
| 4,220,457 | 9/1980 | Fredriksen ..................... 55/337 |
| 4,242,115 | 12/1980 | Harold et al. . |
| 4,266,953 | 5/1981 | Matthys et al. . |
| 4,299,597 | 11/1981 | Oetiker et al. ................. 95/280 |
| 4,303,423 | 12/1981 | Camplin et al. . |
| 4,331,459 | 5/1982 | Copley . |
| 4,359,330 | 11/1982 | Copley . |
| 4,364,751 | 12/1982 | Copley . |
| 4,411,674 | 10/1983 | Forgac ............................. 55/431 |
| 4,452,616 | 6/1984 | Gillingham et al. . |
| 4,482,365 | 11/1984 | Roach ............................. 55/343 |
| 4,482,366 | 11/1984 | Camplin et al. . |
| 4,514,193 | 4/1985 | Booth ............................. 55/337 |
| 4,537,608 | 8/1985 | Koslow ........................... 55/337 |
| 4,746,340 | 5/1988 | Durre et al. . |

Primary Examiner—Charles S. Bushey
Attorney, Agent, or Firm—Merchant, Gould, Smith, Edell, Welter & Schmidt

[57] ABSTRACT

An air cleaner construction including a precleaner arrangement, a filter assembly and a scavenger arrangement is provided. In the precleaner arrangement, air directed into the air cleaner assembly is subjected to some particulate removal. The air from the precleaner arrangement is then directed into the filter assembly, for further particulate material. The scavenger arrangement is constructed and arranged to scavenge separated particulate material from both the precleaner arrangement and the filter assembly. A pulse jet cleaner assembly is provided to facilitate removal of particulate material from the filter assembly.

8 Claims, 11 Drawing Sheets

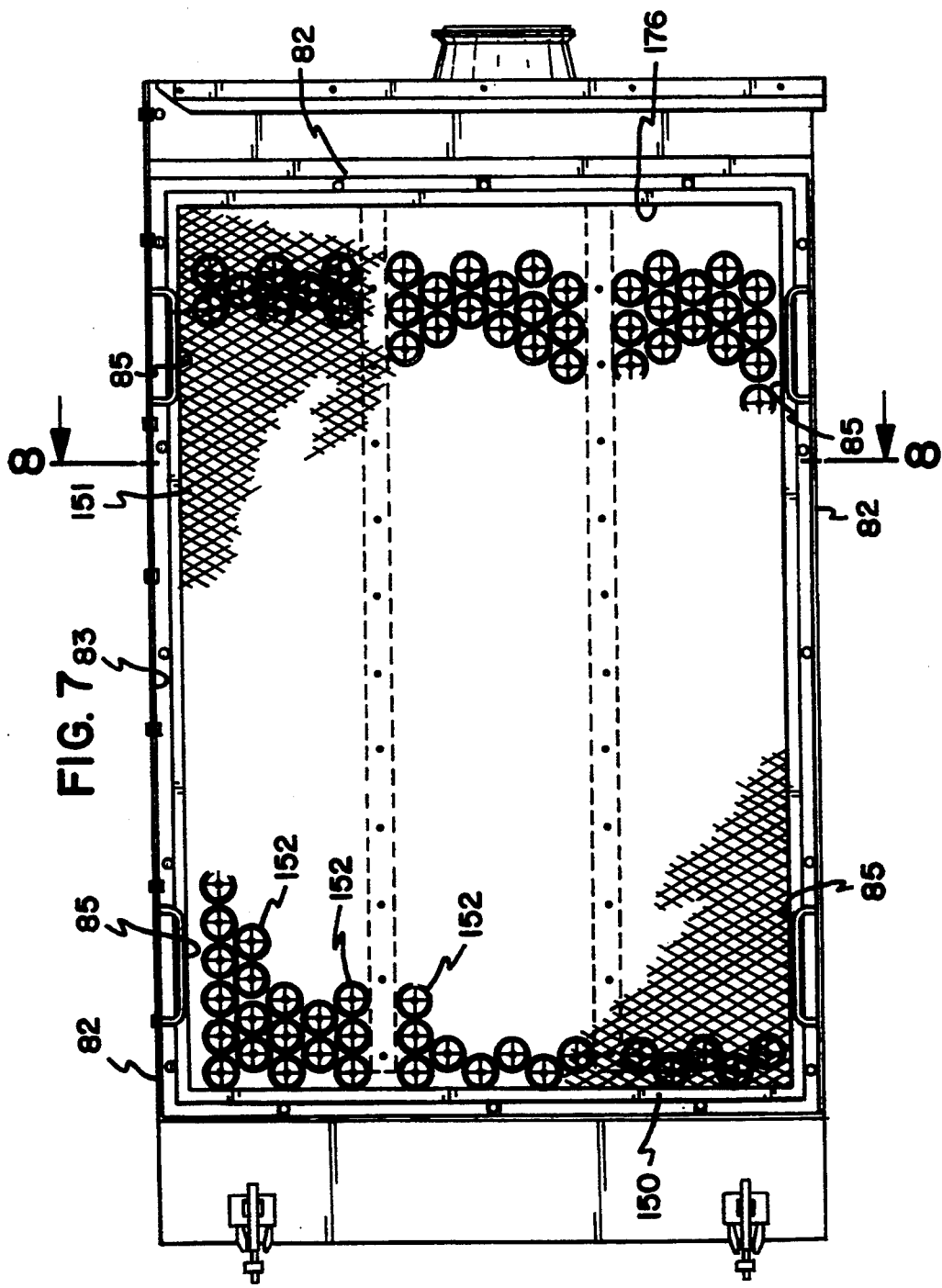

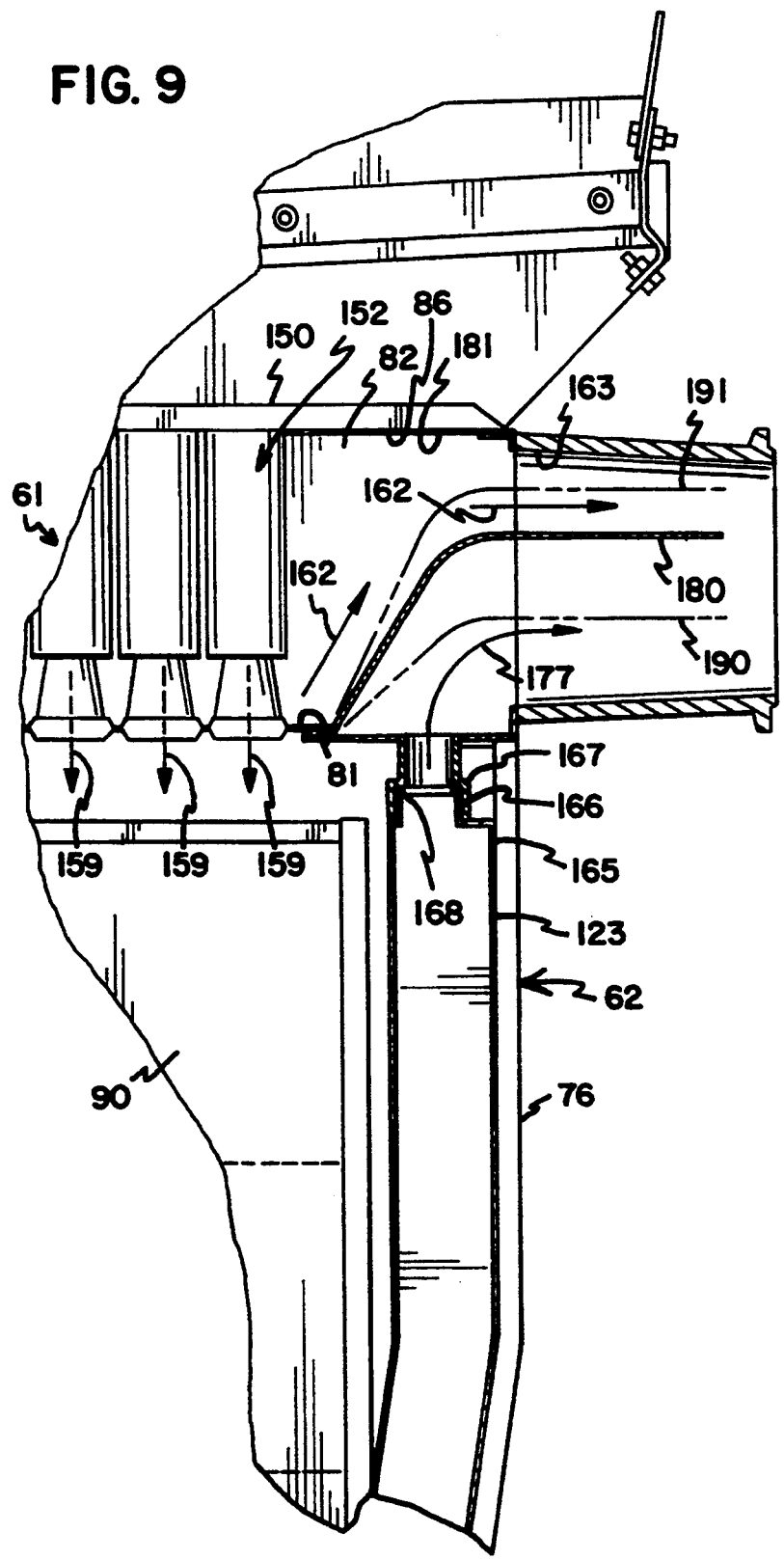

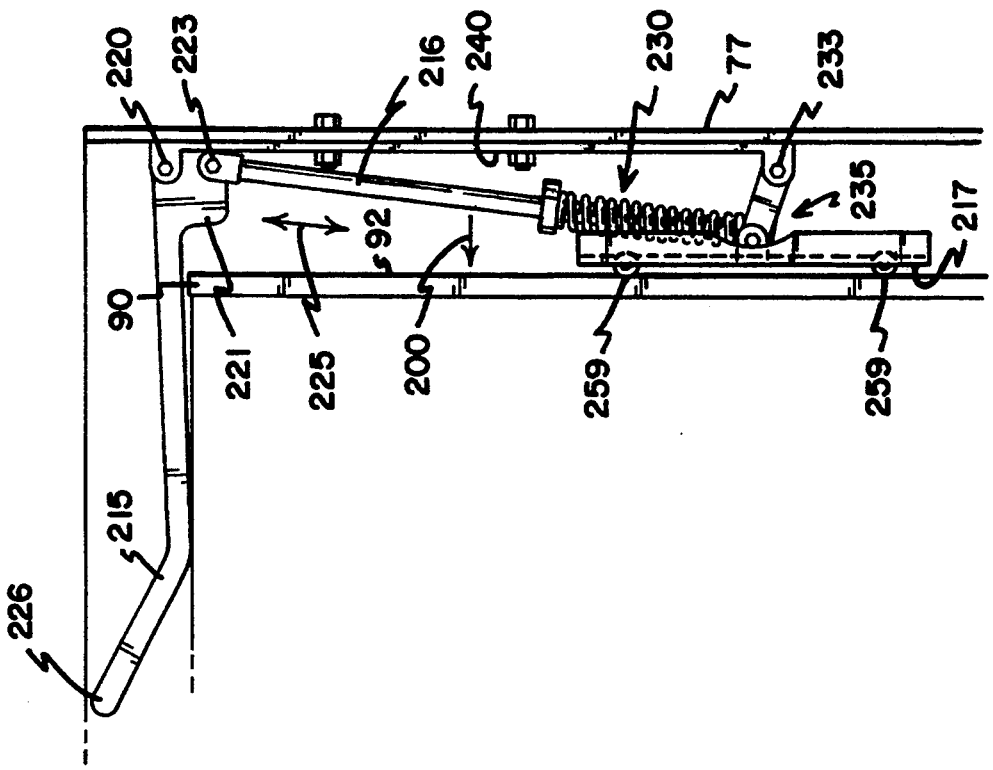
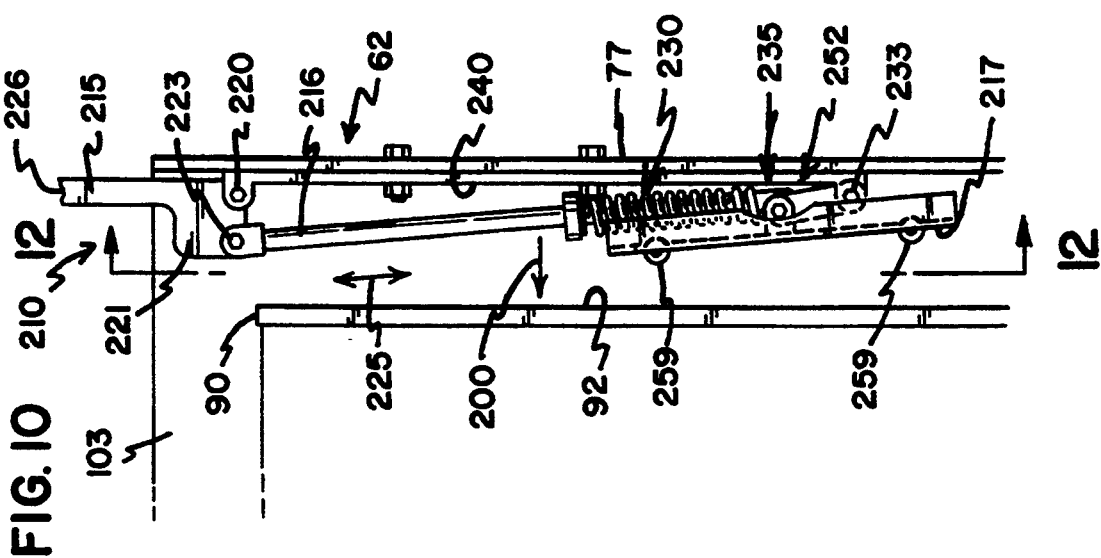

AIR CLEANER HAVING SCAVENGER ARRANGEMENT FOR PRECLEANER AND FILTER THEREOF

FIELD OF THE INVENTION

The present invention relates to air cleaners and air filter arrangements. It particularly concerns such arrangements which include pulse jet air cleaner assemblies for periodic regeneration. Although the principles described herein may have other applications, they are particularly adapted for modifications of existing air filter arrangements in M1 tanks to improve performance. The present application also concerns methods of preparing preferred air cleaner arrangements as described, and methods of use.

BACKGROUND OF THE INVENTION

Although the principles described herein may have application in a variety of contexts, a brief description of the conventional air filter system of the M1 tank provides a general background for understanding the present invention.

As with almost any internal combustion engine, the engine which operates the M1 tank requires large amounts of ambient air for operation. In general, the ambient air is filtered, for removal of particulate matter therein, before it is directed into the gas turbine which powers the M1 tank.

In FIG. 2, a schematic is presented which illustrates the basic operation of the air filter system for the M1 tank, prior to development of the present invention. Referring to FIG. 2, the reference numeral 1 generally indicates the M1 air filter system, for removal of particulate material from the air flow stream which is directed to the engine. Air filter system 1 comprises assembly 2 with inlet (surface) 3 (for ambient air) and outlet 4 (through which clean air is directed to the engine). Assembly 2 defines a two stage air cleaning system. The first or most upstream stage is indicated generally at 7. The second or downstream stage is indicated generally at 8.

The upstream stage 7 comprises a precleaner 10. The precleaner 10 is constructed and arranged for removal of large amounts of particulate material within the ambient air stream, before the air stream is directed into the second stage 8. For the conventional M1 tank air cleaner, precleaner 10 is generally as described in reference to FIGS. 7–10 of U.S. Pat. No. 4,242,115. (The complete disclosure U.S. Pat. No. 4,242,115 is incorporated herein by reference). Such systems are commercially available from Donaldson Company, Inc., Minneapolis, Minn., under the tradename STRATA PANEL. They generally comprise a plurality of centrifugal separators, through which air having particulate material therein is directed. As the air travels through the centrifugal separators, the dust settles in the precleaner 10. The settled dust is removed (scavenged) from precleaner 10 through outlet 11, in a scavenge air stream 12 provided by blower 13. The partially cleaned air exiting the centrifugal separators is directed into the second stage 8, along the path indicated at 15.

Within the second stage cleaner 8, air flow is directed through a particulate filter system, for removal of still more dust and contaminants. The particulates remain in chamber 17 (i.e. in the filters) of the second stage 8, whereas the clean air, after passing through the air filters, is directed through outlet 4 to the engine. A variety of air filter constructions may be utilized within chamber 17. In general, arrangements generally as described in U.S. Pat. Nos. 4,331,459; 4,364,751; and 4,359,330, each of which is incorporated herein by reference, may be, and have been, utilized within chamber 17 in systems similar to, and including, M1 tanks.

During Operation Desert Storm, the M1 tank was operated in an environment (desert) wherein large amounts of fine dust would be picked up in the ambient air and be carried into the air filter'system 1. Even with the precleaner 10 operating at maximum capacity, large amounts of dust were still carried with the air stream 15 directed into chamber 17. While, in general, the air filters positioned within chamber 17 were sufficient for separation of the particulates from the air, the filters and in some instances chamber 17 would rapidly fill with separated dust. As a result, periodically chamber 17 needed to be opened, the filters needed to be removed, and the filters and/or chamber needed to be cleaned of dust or other particulate material. In some instances it was found that the tanks could travel no more than about 10–20 kilometers, before such a cleaning was necessary.

A "plugged" or "clogged" air filter, in the field, for a vehicle such as a tank is no trivial problem. A plugged air filter can render a vehicle immobile. A cleaning of the air filter may require the tank to be stopped, and armor plating to be opened or removed. Indeed, such was found to be the case in Operation Desert Storm.

Also, frequent cleaning of an air filter system in the field presents risks, such as loose dirt, dust or gravel falling into the engine. Thus, it would be preferred to limit the number of times the air cleaner system is opened, in the field.

SUMMARY OF THE INVENTION

According to the present invention an air cleaner construction is provided, for cleaning air entering systems such as tank engines. The air cleaner construction includes a precleaner arrangement constructed and arranged for direction of air flow therethrough and selected separation of particulate material from the air flow as it is directed through the precleaner. The air cleaner construction also includes an air filter assembly constructed and arranged to receive selected air flow from the precleaner arrangement and to direct the air flow through a filter arrangement. In addition, the air cleaner construction includes a scavenger arrangement constructed and arranged to selectively withdraw separated particulate material from both the precleaner arrangement and the filter assembly.

In preferred embodiments, a pulse jet cleaner assembly is provided. The pulse jet cleaner assembly includes means for selectively directing a pulse of gas through the air filter arrangement of the filter assembly in a direction opposite to filtering flow of air directed therethrough. Thus, the pulse jet cleaner assembly can knock particulate material trapped on the filter assembly therefrom, to facilitate scavenging.

In preferred embodiments, the precleaner arrangement comprises a plurality of centrifugal separators constructed and arranged for selected separation of particulate material from an air flow stream directed therethrough. Thus, as air passes through the precleaner arrangement, through use of a centrifugal separation technique, particulates are separated from the air flow stream. The particulates are then scavenged from the precleaner arrangement by the scavenger arrangement; and, the air passes into the filter assembly wherein still further particulates are separated by filtering.

In preferred applications, the filter assembly includes at least one filter unit or pack therein. Each filter pack preferably comprises first and second filter panels (preferably pleated paper filters or other surface loading media) oriented to have a clean air space therebetween. That is, in filtering, air flow is passed through one of the filter panels and into the clean air space. In such arrangements, a pulse jet air cleaner assembly is provided to direct a pulse of gas into the clean air space between the first and second filter panels.

In preferred constructions according to the present invention, the scavenger arrangement includes at least one perforated scavenger duct oriented in sufficient proximity to each filter pack, and more preferably each filter panel, to collect particulate material flushed therefrom by the pulse of gas.

Preferred arrangements include at least two filter packs therein, with an intermediate and imperforate wall panel positioned between each filter pack. For such arrangements, the scavenger arrangement preferably includes at least one perforated scavenger duct (having scavenger apertures) oriented to collect particulate material from the space between each filter pack and each intermediate wall panel. In some assemblies, a single scavenging duct, having scavenging apertures oriented on opposite sides of the intermediate wall panel, can be used between a pair of filter packs. In such an arrangement, one scavenging duct can be utilized to scavenge dust from regions on opposite sides of an intermediate wall panel.

In preferred embodiments, the clean air space of each filter pack, i.e. the space between pleated paper filter panels positioned within the pack, is separated into vertically disposed chambers. Preferably the pulse jet air cleaner assembly is constructed and arranged to selectively provide for separate pulses of air into each of the separate chambers of the clean air space, for each filter pack.

Also, according to the present invention a filter pack locking assembly is provided, to secure the filter packs within the construction. The assembly preferably is mounted on a housing side wall for the filter assembly, and includes means for biasing an associated filter pack against the side wall. Preferably an over center locking mechanism is utilized, to ensure secure engagement.

BRIEF DESCRIPTION OF THE DRAWINGS

in FIG. 4 portions being shown broken away to view internal detail.

in FIG. 6 a portion being shown in phantom.

FIG. 7 is an enlarged top plan view of a precleaner portion of the arrangement shown in FIGS. 4 and 5.

FIG. 9 is an enlarged fragmentary side elevational view of a portion in the arrangement shown in FIG. 4, with portions broken away to show internal detail.

FIG. 10 is an enlarged fragmentary schematic view of a portion of the arrangement shown in FIG. 5, depicted in an unlocked configuration.

FIG. 11 is an enlarged fragmentary side elevational view analogous to FIG. 10, with the component depicted being shown in a locked configuration.

DETAILED DESCRIPTION OF THE INVENTION

As indicated generally above, the principles of the present invention may be applied to the air filter systems of a variety of equipment; tanks in general and the M1 tank in particular merely representing examples. However, the principles of the present invention were particularly developed for modifications of existing M1 tank filter designs, to improve operation. Therefore, herein the present invention will be described with reference to the M1 tank and its air filter assembly.

The M1 Tank Generally

Figure 1:
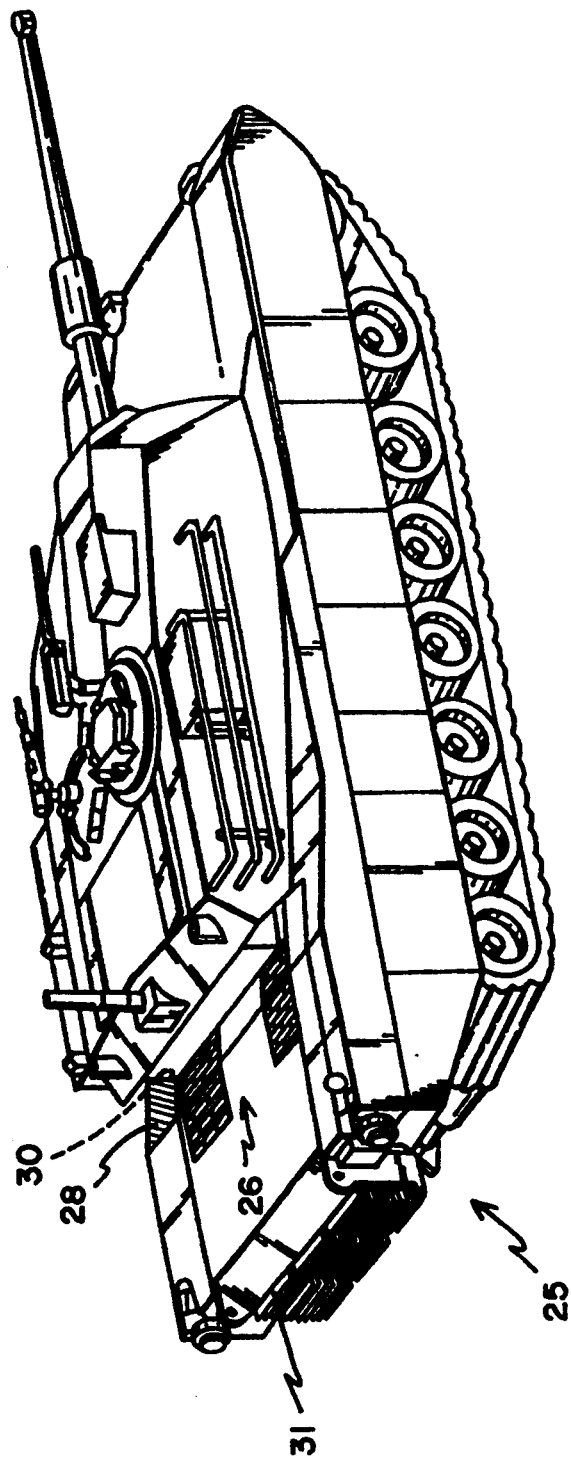
FIG. 1 is a schematic perspective view of an M1 tank.

The reference numeral 25, FIG. 1, generally designates an M1 tank. The M1 tank 25 is gas turbine powered. The turbine engine is generally located under armor plating, in the region indicated generally at reference numeral 26.

An air inlet (or intake cover) for the gas turbine system (engine) is generally indicated at reference numeral 28. The air filter construction, whether of the prior art type indicated generally in FIG. 2 and described above, or improved according to the principles of the present invention, is indicated under the armor plating generally at 30. A scavenger outlet, for exhaust of particulate material from the air filter construction 30, is indicated generally at 31.

From a review of FIG. 1, some of the problems associated with any need to obtain access to portions of air filter construction 30, in the field, for cleaning will be apparent. At least portions of armor plating would need to be opened or removed, for access to construction 30. This requires that the tank 25 be stopped, the engine be shutdown, and the turret be rotated to a required position, so that personnel can work on the exterior armor, to open same. The tank would then be immobile, until completion of the cleaning. Also, the cleaning step requires working in the very hot engine area, an area of limited space. The personnel have to carefully align the required parts, and take care to ensure proper assembly. This is clearly a time consuming and inconvenient process.

It will also be apparent from review of FIG. 1 that limited space is available in the M1 tank 25 for addition of new equipment, modification of existing equipment, etc. The principles of the present invention were specifically developed to accommodate problems associated with modification of the existing M1 tank without generation of problems due to addition of many further components or substantial changes in the exterior geometry or configuration of various equipment underneath the armor plating. In addition, the principles were developed to take advantage of the various equipment, systems etc. already in place within the tank 25.

Improved Air Filter Constructions According to the Present Invention—Generally

Figure 2:
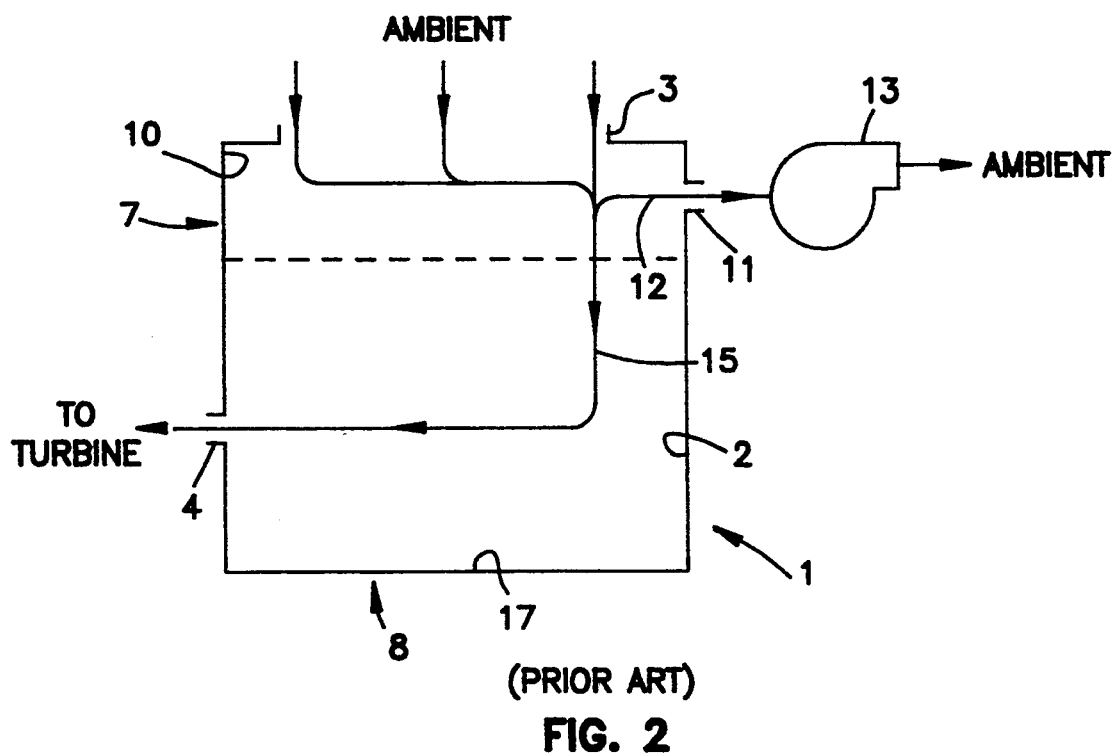
FIG. 2 is a schematic view of an air filter system for an engine of the M1 tank, prior to modification according to the principles of the present invention.
Figure 3:
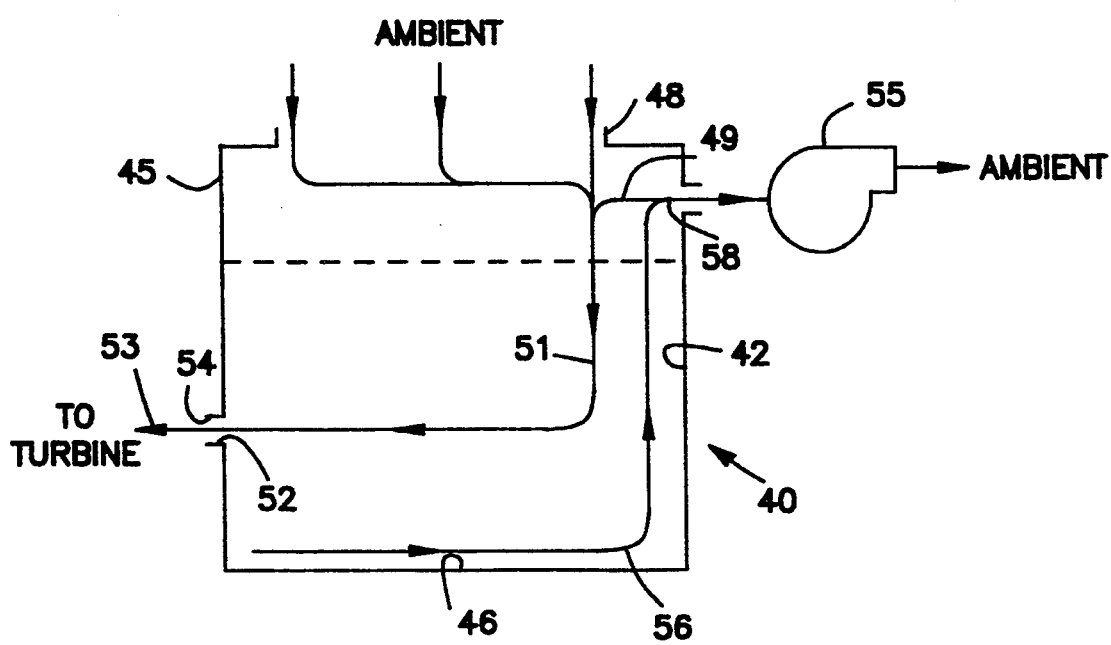
FIG. 3 is a schematic view of an air filter arrangement according to the principles of the present invention.

The general principles of operation of improved air filter constructions or assemblies according to the present invention will be understood by reference to FIG. 3. FIG. 3 is a schematic representation, generally analogous to FIG. 2. Referring to FIG. 3, an air filter construction according to the present invention is indicated generally at reference numeral 40. Air filter construction 40 may comprise, for example, air filter construction 30 FIG. 1.

Referring still to FIG. 3, air filter construction 40 comprises an exterior assembly 42. Assembly 42, FIG. 3, is represented schematically with essentially the same exterior dimensions as housing 2, FIG. 2, to illustrate the point that air filter constructions 40 according to the present invention can, if desired, be proportioned and arranged to occupy approximately the same volume as previous air filter constructions utilized in the M1 tank. Thus, while efficiency of operation (especially with respect to particulate material removal and operation without plugging) may be improved greatly with systems according to the present invention, improvement can be obtained without an undesirable cost in terms of space.

Referring to FIG. 3, air filter construction 40 includes precleaner arrangement or precleaner 45 and a filter assembly including filter element housing 46. Ambient air is directed into air filter construction 40 through inlet 48. Within precleaner 45 substantial amounts of particulate material are removed from the air stream, by centrifugal separators. Scavenge flow of the deposits from precleaner 45, is indicated at path 49. After passage through precleaner 45, air (still carrying some particulate material therein) is directed into a filter assembly comprising filter element housing 46 along the path indicated by reference numeral 51. In filter element housing 46, the air to be filtered is directed through filter elements (not shown in FIG. 3) for further filtering. Clean air exits air filter construction 40 through outlet 52 into a clean air plenum 54. This air is directed through the plenum 54 to the turbine, as indicated at 53.

Blower 55 provides for air flow in path 49, to scavenge dust from precleaner 45 and direct same to the ambient (through outlet 31, FIG. 1).

For the arrangement shown in FIG. 3, means are provided to scavenge dust from filter element housing 46. Scavenge flow is generally indicated along the path identified by reference numeral 56. The scavenge flow along path 56 is also provided by blower 55, as indicated. For the embodiment shown, scavenge flow from path 56 joins scavenge flow from path 49 at junction 58.

The basic principles of operation of modified systems according to the present invention will be understood by reference to FIG. 3. Dust collection, to a point of plugging or clogging the air filter construction (in filter element housing 46) is inhibited by the dust scavenge reflected at path 56 (especially in association with pulse cleaning described below). That is, dust buildup (excessive buildup of deposits) in housing 46 is inhibited by scavenging flow therefrom. Air flow for the scavenging is provided by blower 55, the same blower operationally located to conduct the scavenging from the precleaner (precleaner 45, FIG. 3; or, precleaner 10, FIG. 2).

Indeed, one of the problems overcome in developing an arrangement for operation according to the principles of the present invention, specifically in an M1 tank, was achievement of sufficiently efficient scavenge operation in a manner such that a completely new blower would not be required. Alternately stated, it was desired that the principles of the present invention be developed such that blowers already existing in M1 tanks did not need to be fully replaced; and, further, such that scavenge flow outlet ducts, etc. did not need to be changed. Certain construction and assembly details which facilitated this are described hereinbelow.

A Specific Preferred Construction for Use in the M1 Tank

Figure 4:
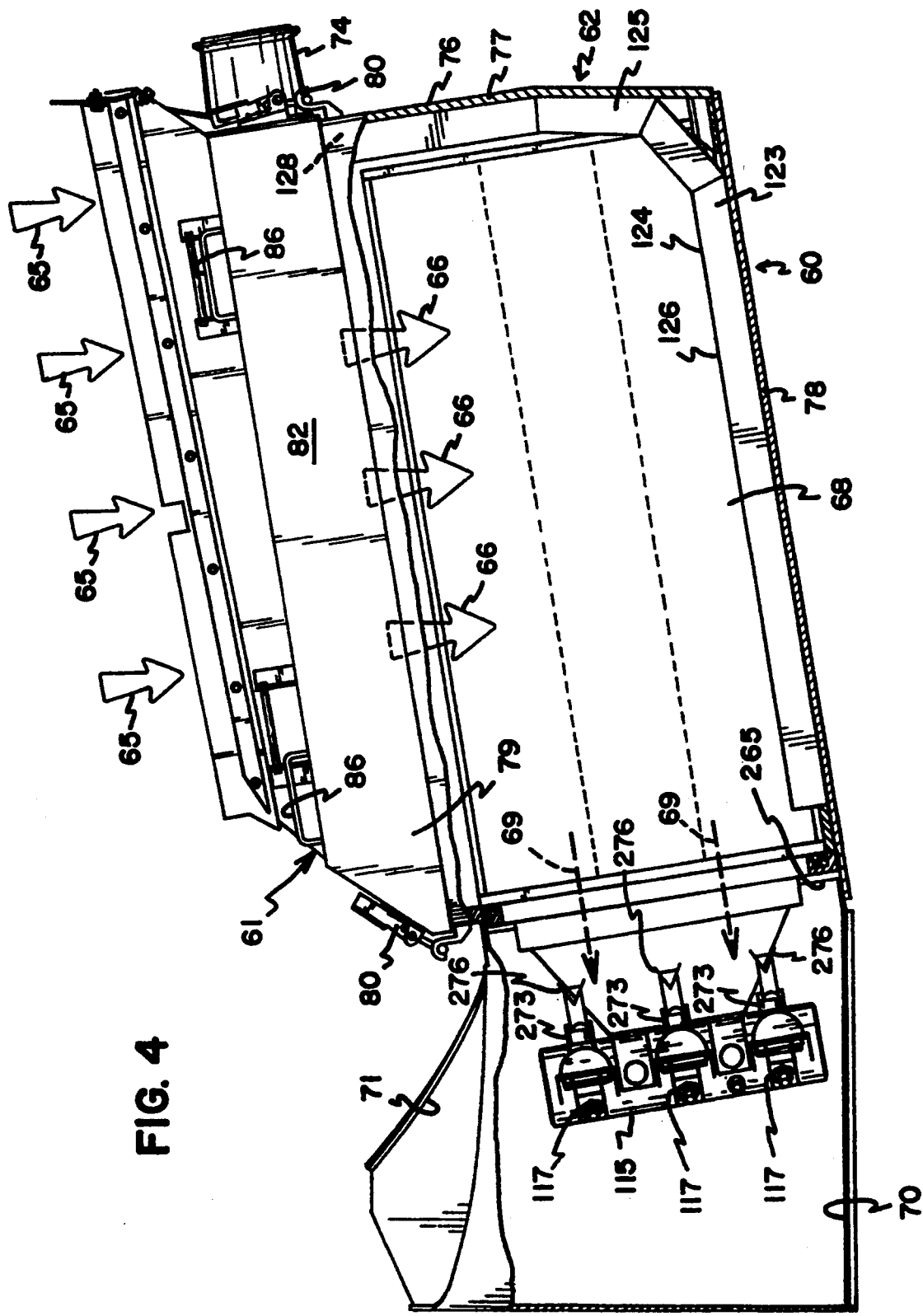
FIG. 4 is a side elevational view of an arrangement according to the schematic of FIG. 3.
Figure 5:
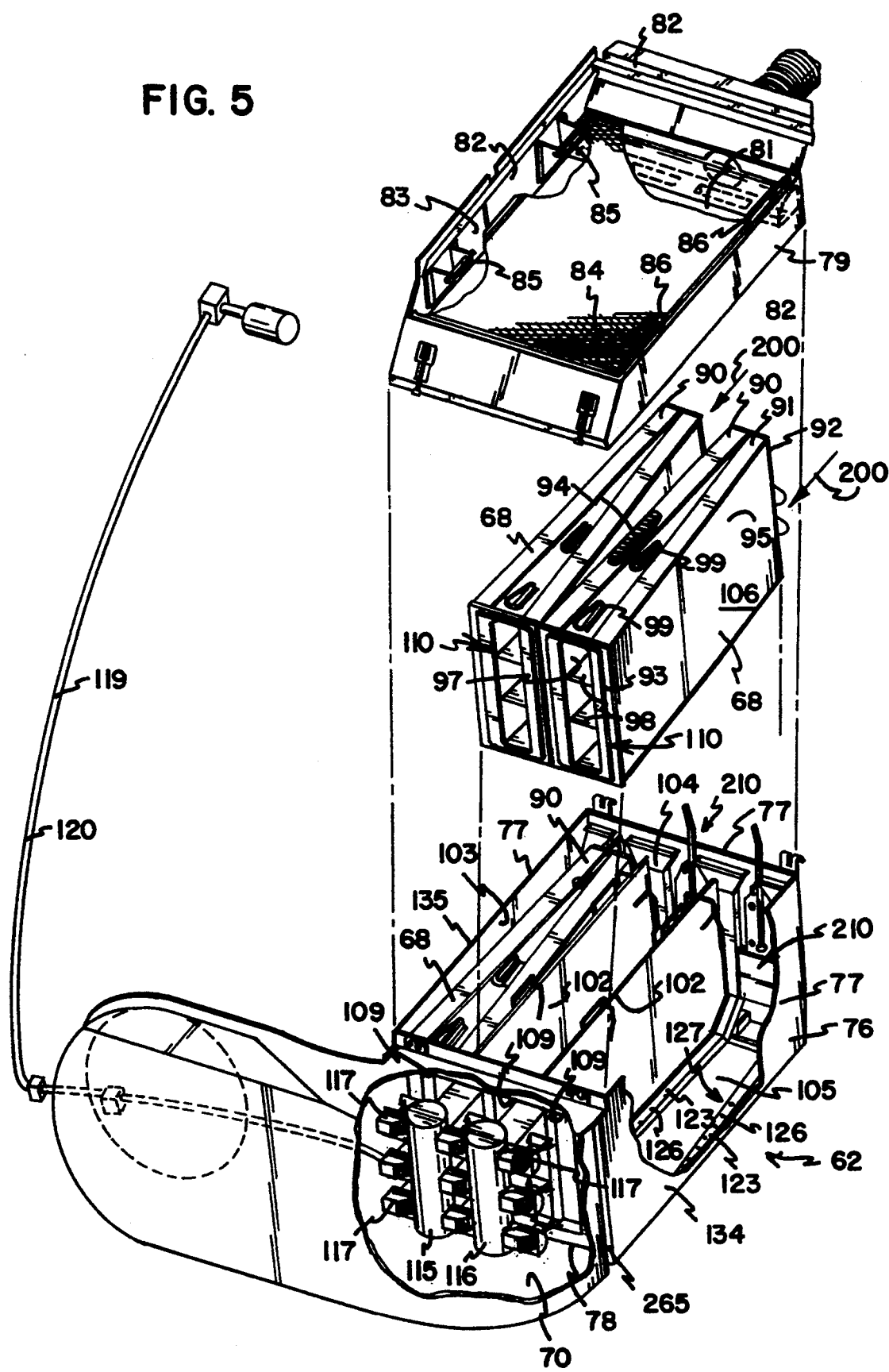
FIG. 5 is a fragmentary, exploded perspective view of the arrangement shown in FIGS. 3 and 4, with portions broken away to show internal detail.

Attention is now directed to FIGS. 4 and 5 wherein a specific preferred air filter construction according to the principles of the present invention (and configured for use with the M1 tank) is depicted. In FIG. 4 the arrangement is shown in side elevation, with portions broken away, so that the configuration is presented from a viewpoint analogous to that shown in FIG. 3, to facilitate understanding.

Referring to FIG. 4, the air filter construction is indicated generally at reference numeral 60. Air filter construction 60 includes precleaner arrangement assembly 61 and filter assembly 62.

The precleaner assembly 61 is positioned upstream (relative to air flow through the entire construction 60) from the filter assembly 62. In general, air enters precleaner 61 along the path indicated generally by arrows 65. The air passes through precleaner assembly 61 and into filter assembly 62 along the path indicated generally by arrows 66. In filter assembly 62, the air is then directed through filter elements or constructions, such as filter element 68. The filtered air passes outwardly from filter assembly 62 along the path indicated generally by arrows 69. Air in clean air plenum 70 is then directed toward the engine by exit tube construction 71.

Scavenge flow is directed by a scavenger arrangement including a blower, from the precleaner assembly 61, through outlet 74. For the arrangement shown in FIG. 4, the scavenge flow which exits air filter construction 60 through outlet 74 carries dust scavenged from both of the precleaner assembly 61 and the filter assembly 62. Means for efficiently accomplishing this is described hereinbelow.

Still referring to FIG. 4, filter assembly 62 comprises filter element housing 76. For the embodiment shown, housing 76 comprises a generally rectangular box construction defined by side walls 77 and floor 78. Its configuration is shown in perspective, in FIG. 5. The housing 76 may be of the same external size and dimension as a conventional housing in an M1 tank. Indeed, the construction 60 may comprise a conventional housing, modified by having components therein and thereon to generate a construction 60 according to the present invention.

A portion of the precleaner assembly 61 rests on top of the side walls 77, to act as a cover 79 for the filter element housing 76. Cover 79 is secured in position by latches 80, FIG. 4.

Referring to FIG. 5, cover 79 comprises floor panel 81 and side panels 82. Floor panel 81 and side panels 82 define a receptacle 83, which contains a precleaner panel 84 described hereinbelow for precleaning operation. Handles 85 and 86 facilitate assembly.

As thus far described, the air filter construction 60, depicted in FIGS. 4 and 5, has an exterior geometry substantially the same as arrangements utilized in M1 tanks prior to development of the present invention. That is, much of the exterior configuration (size, shape etc.) has not been changed significantly. However, interior components have been changed substantially, to facilitate operation as described.

Referring to FIG. 5, filter assembly 62 includes a plurality of filter constructions or elements 68 positioned therein. For the particular arrangement shown, each filter element 68 comprises a "V-shaped" air filter pack 90; and, filter element housing 76 is sized and shaped to operably receive three V-shaped air filter packs 90 therein (aligned side-by-side, but spaced apart), during use and assembly.

Each of V-shaped air filter packs 90 may be generally as described with reference to FIGS. 3 and 4 in U.S. Pat. No. 4,364,751. (The complete disclosure of U.S. Pat. No. 4,364,751 is incorporated herein by reference). That is, each comprises a frame 91 with end caps 92 and 93. For the embodiment shown, each V-shaped air filter pack 90 comprises two panels 94 and 95 of filter media; the two panels 94, 95 being oriented in a V-configuration, with an internal channel or space 97 positioned therebetween. For the arrangements utilized in the constructions of FIGS. 4 and 5, each internal space or channel 97 is divided into three-compartments (vertically disposed compartments when assembled for use) by internal baffles 98. Handles 99 on frame 91 facilitate handling.

Panels 94 and 95 are each occupied by filter media. The media of each panel may comprise, for example, surface loading media such as pleated paper filter media. A preferred such media for use in arrangements according to the present invention is ULTRA-WEB® high performance air filtration media, available from Donaldson Company, Inc., Minneapolis, Minn. 55440. Such a media comprises a paper filter having a layer of ultrafine (submicron diameter) fibers bonded to a surface thereof.

Still referring to FIG. 5, imperforate internal panels 102 divide filter element housing 76 into three chambers 103, 104, and 105. During use, a single V-shaped air filter pack 90 is positioned in each of chambers 103, 104, and 105 respectively. Advantages provided by panels 102, in dividing and separating the individual V-shaped air filters 90 from one another, will be understood from further descriptions.

Operation of V-shaped air filter packs 90, to filter air passing through filter assembly 62, is generally as follows. The air enters the panels 94 and 95, and is directed toward internal space 97. Particulate material is left on the exterior surfaces (for example surface 106) of the panels 94 and 95 (i.e. the side or surface of the panel directed away from internal space 97) or on the developing filter cake thereat. The filtered air passes into internal space 97 and outwardly from housing 76 through ports 109; i.e. along the paths indicated by arrows 69, FIG. 4. In general, end cap 93 of each V-shaped air filter pack 90 includes means 110 for sealing therearound, to provide a sealing engagement with ports 109 and inhibit leakage of non-filtered air into clean air plenum 70. One way to accomplish this is to provide the end cap 93 of each V-shaped air filter pack 90 with a sharp projection thereon, circumscribing ends of channels 97; and, to provide each aperture 109 with a sealing gasket therearound, oriented to engage the sharp projection, to form a seal.

If, periodically, it is desired that V-shaped air filter packs 90 be removed or replaced, the filter packs 90 can be removed as follows. Latches 80, FIG. 4, would be loosened so that cover 79 can be removed from housing 76. A locking mechanism, described in detail below, which secures each V-shaped air filter pack 90 in place, can be loosened. The maintenance person can then grab handles 99, and pull V-shaped air filter pack 90 upwardly and outwardly from the receptacle 76.

In the field regeneration of V-shaped air filter packs 90 is conducted without disassembly. This is accomplished through use of a pulse jet air cleaner assembly or system. In general, such a system provides for a selected jet pulse of air directed "backwards", or as a "back flush", through the filter panels 94 and 95. By "backwards" in this context, it is meant that the pulse jet is directed opposite to normal air flow (i.e. filtering air flow) during filtering of ambient air. For the arrangements shown in FIGS. 4 and 5, this direction would be with the pulse jet aimed into chambers 97, to ultimately direct air through panels 94 and 95 and then outwardly from surfaces 106. Such a direction of air flow will tend to flush dust or other particles collected on surface 106 therefrom.

Pulse jet air cleaning arrangements, utilized with V-shaped air filter packs, are known. Systems to accomplish this are described, for example, in U.S. Pat. Nos. 4,364,751 and 4,331,459 incorporated herein by reference. While such a system may be utilized in arrangements involving many of the principles described herein, the preferred embodiment described and shown in the drawings herein concerns advantageous modifications to such conventional arrangements.

Referring to FIG. 5, a compressed air tank assembly for creation of the cleaning pulses or jets is illustrated generally at reference numeral 115. The compressed air tank assembly includes a tank system 116 with nine pulse jet valves 117 thereon. The nine pulse jet valves 117 are organized in three groups of three valves, one group associated with (aligned with) each V-shaped air filter pack 90. In particular one pulse jet valve 117 is directed into each, separate, internal portion of volume 97 that is defined by the internal baffles 98 (of each V-shaped air filter pack 90). A similar arrangement of valves is, for example, described in U.S. Pat. No. 4,364,751 mentioned above.

Compressed air is directed into tank system 116 by arrangement 119 which includes a bleed air conduit 120 from the turbine. Various valve arrangements, not shown, can be used to direct and control flow of the bleed.

Periodically all or selected ones of pulse jet valves 117 may be opened to release a pulse or jet of air into an associated portion of the internal space 97 of a V-shaped air filter pack 90. This jet pulse will tend to flush dirt, dust or the like off of the panels 94 and 95. Dividers or panels 102 will inhibit the particulate material from simply being transferred to an adjacent one of the V-shaped air filter packs 90. Rather, the particulate material will tend to disperse into the region immediately surrounding the panel from which it is flushed, to be scavenged. A preferred sequence methodology for operation of the nine valves 117 is described herein below.

As indicated above, according to the present invention particulate material within filter element housing 76 is scavenged therefrom, by a scavenger arrangement, to inhibit clogging and to extend filter lifetime. The scavenge system is generally as follows.

Referring to FIGS. 4 and 5, the scavenger arrangement shown includes various scavenge ducts 123 are positioned within filter element housing 76. Each scavenge duct 123 comprises a conduit 124 (FIG. 4) which extends downwardly into housing 76, as indicated by section 125, and then across floor 78, as indicated at section 126. Each scavenge duct 123 includes a plurality of apertures or holes 127 therein, FIG. 5. The holes 127 are positioned in the portion or section 126 of conduit 124 that extends across floor 78.

In operation, a draw of air into holes 127, through conduit 124 and outwardly therefrom at end 128, FIG. 4 is selectively provided. For preferred arrangements according to the present invention, the draw of air is provided by the same blower which operates to draw the scavenge flow from the precleaner, for example blower 55 FIG. 3. That is, the scavenge flow from end 128 of conduit 124 is directed through outlet 74, FIG. 4. In general, as air is drawn into holes 127, particulate material in housing 76 will also be drawn into the scavenge duct 123. Thus, through appropriate attachment of a blower to the exit 128 of conduit 124, continuous (or at least selected) vacuuming or sweeping of filter element housing 76 is provided, to facilitate extended operation without plugging of the filters 90. The particular configuration of conduits 124, and orientation of holes 127 therein, facilitates operation. Advantageous specific constructions are illustrated in FIG. 6.

Figure 6:
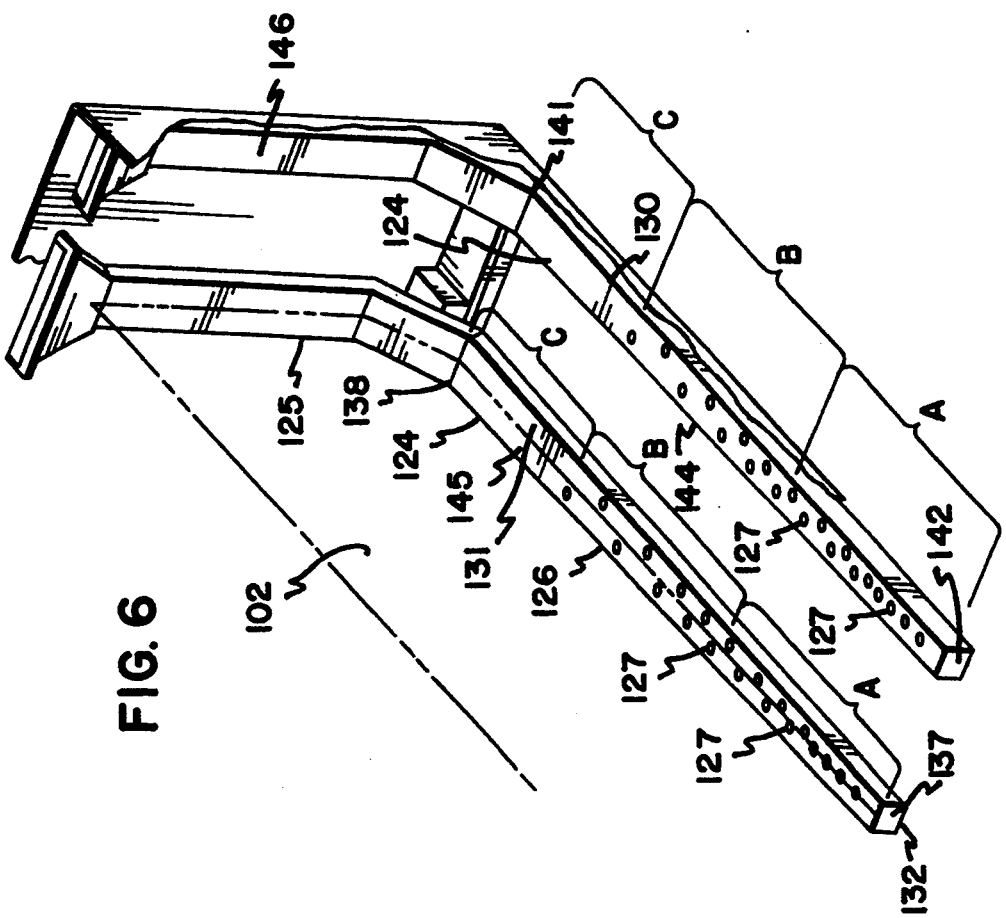
FIG. 6 is an enlarged fragmentary, perspective view of a portion of the arrangement shown in FIG. 5.

FIG. 6 is a fragmentary perspective view of a portion of the arrangement shown in FIG. 5. In particular, in FIG. 6 two of the four conduits 124 from the arrangement shown in FIG. 5 are depicted.

Referring to FIG. 6, side conduit 130 and central conduit 131 are depicted. The assembly illustrated in FIG. 5 would include two side conduits and two central conduits. One side conduit (analogous to conduit 130, FIG. 6), would extend across floor 78 at (or along) each of opposite side walls 134 and 135. In general, the side conduits are each positioned between a respective one of side walls 134 and 135, and a respective first adjacent V-shaped air filter pack 90.

Central conduits (analogous to conduit 131, FIG. 6) are positioned between each of the V-shaped air filter packs 90. That is, one central conduit 131 extends into the space between any two adjacent V-shaped air filter packs 90.

For the arrangement shown in FIG. 5, since three V-shaped air filter packs are involved, preferably two central conduits (one between each adjacent pair of V-shaped air filter packs 90) are used and, two side conduits (one at each end of the row of V-shaped air filter packs 90) are preferably used.

Referring to FIG. 6, in general each central conduit 131 includes one of panels 102 positioned thereon. In FIG. 6, panel 102 is shown in phantom.

Still referring to FIG. 6, each central conduit 131 tapers in width to a narrow end 137 as it extends across floor 78 (FIG. 5) from the downward section 125. By this it is meant that the width or cross-sectional dimension of central conduit 131 decreases, as end 137 is approached from end 138. This is in contrast to the V-shaped air filter packs 90, which get wider from end cap 92 to end cap 93. Indeed, the tapering of the conduits 131 accommodates (and generally corresponds to) the widening of filter packs 90.

Preferably, each central conduit exhibits a relatively low profile or relief, from floor 78, on the order of about 1–2 inches (2.5–5.1 cm). A low profile or relief ensures that apertures 127 therein are positioned near floor 78, for efficient scavenging. The low relief also helps avoid structural interference with filtering flow to the filter packs 90. The particular conduit 131 shown, has a generally rectangular cross-section, with a flat upper surface, although alternative arrangements could be utilized. The conduits 130, 131 are preferably four sided, enclosed, tubes.

Side conduit 130 is constructed analogously to central conduit 131, except in typical preferred embodiments it will only be about half as wide. In particular, side conduit 130 tapers in cross sectional dimension as it extends across floor 78 from end 141 to end 142. Apertures 127 in conduit 130 are preferably sized about the same as apertures 127 in conduit 131, and are spaced similarly, i.e., they are spaced more closely to one another near to end 142 then they are in the region of end 141.

Preferably section 144 of conduit 130, i.e., the section which extends across floor 78, provides a relief on the order of about 1–2 inches (2.5–5.1 cm), approximately the same profile or relief as provided by section 145 of a conduit 131. For the particular arrangement shown, conduit 130 has a generally rectangular cross-section with a flat upper surface, although alternatives are possible. Section 144 is provided in air flow communication with the blower, not shown, by upward extension 146.

Holes 121 in the conduits 130, 131 are ranged in a preferred manner in order to obtain high dust removal and to take advantage of the somewhat limited amount of scavenge air flow that is available in the system. As shown in FIG. 6, approximately 84% of the total aperture or hole area in each of the ducts (130, 131) is located in a third of the duct closest to the closed ends (137 and 142 respectively). This is in the regions indicated in FIG. 6 as A. Approximately 16% of total hole area is located in the middle third of the floor ducts, indicated generally at FIG. 6 at B. Generally no holes are positioned in the third of the ducts located closest to the open ends (138 and 141 respectively). These are indicated at FIG. 6, at C.

Positioning the holes in the general manner indicated above, is preferred for numerous reasons. The aerodynamic characteristics of the air cleaner tend to cause the largest amount of particulate matter to become deposited on the filter packs 90 near ends 110, FIG. 5. This is in the region toward ends 137, 142 (FIG. 6) of the ducts 131, 130. Because more dust is deposited in this area of the filter packs 90 more scavenge flow (more hole area) is preferred at this location to remove the dust. Also, during operation internal air cleaner pressure is lower in the region where duct ends 137 and 142 are positioned, which means that a greater open area will be needed in the ducts in this location. The total number of holes used in the ducts is preferably large enough to provide sufficient open area such that the volume of air flow drawn into the ducts is not restricted.

Generally, the total open area of the holes used in the duct should be such that the velocity of the air flow entering the holes is maintained within the range of approximately 30–80 feet per second over the normal operating range of the vehicle. There is a preferred size range for the holes used in the ducts, in applications such as those described. I The holes should generally be large enough so that they do not become plugged with small stones or other debris carried into the arrangement from the environment. They should also be small enough to allow available scavenge flow to be spread out over the area required to achieve more or less uniform dust pickup within the system. Holes generated within the size range about 0.25–0.31 inches (0.63–0.79 cm) in diameter are preferred arrangements according to the present invention.

Preferably the ducts are sized such that the cross-sectional area is large enough to provide for an internal velocity that is sufficiently low to avoid unnecessary restriction to the system. Such restriction would tend to reduce overall airflow from the scavenge blower. Also, the duct cross-sectional area should be small enough to maintain an air flow velocity therein sufficiently fast to aerodynamically transport the dust and particulate material scavenged. In the preferred application described, the ducts are sized to maintain an air flow velocity through them of approximately 45 feet per second under a vehicle operating condition of about 20 miles per hour.

Before further detail is given with respect to operation of the scavenge system, for removal of particulate material from filter element housing 76, a discussion of the precleaner assembly 61 is provided.

In FIG. 7, a top plan view of the arrangement shown in FIGS. 4 and 5 is provided, with a precleaner panel depicted within receptacle 83. In particular, and referring to FIG. 7, side walls 82 define receptacle 83. Precleaner panel construction 150 is secured within receptacle 83.

Precleaner panel 150 includes a porous surface grate or screen 151 extending over an upper surface thereof. Underneath screen 151 a plurality of centrifugal separators 152 are operably positioned. Centrifugal separators 152 may be generally as described in U.S. Pat. No. 4,242,115. Each centrifugal separator 152 is comprises a first tubular member 153, FIG. 8, a second lower tubular member 154, and, means for swirling air passing through the first tubular member 153. In preferred applications, the lower tubular members 154 will include ramped outlet portions according to the disclosure of U.S. Pat. No. 4,746,340, incorporated herein by reference (especially FIGS. 4 and 5), to facilitate high separation efficiency at relatively low scavenge flow rates.

In general, the precleaner reduces significantly the amount of contaminants that reach the filter packs 90. Thus pulse cleaning will not be needed as often. This is advantageous, since for use in the M1 tank, the pulse jets rely upon compressed air from turbines for operation. A greater need for compressed air for the cleaners, results in less engine efficiency. Also, even if the pulse jets fail temporarily, the combination of the precleaner and the scavenge ducts, will ensure safe engine operation for a sustained period.

Figure 8:
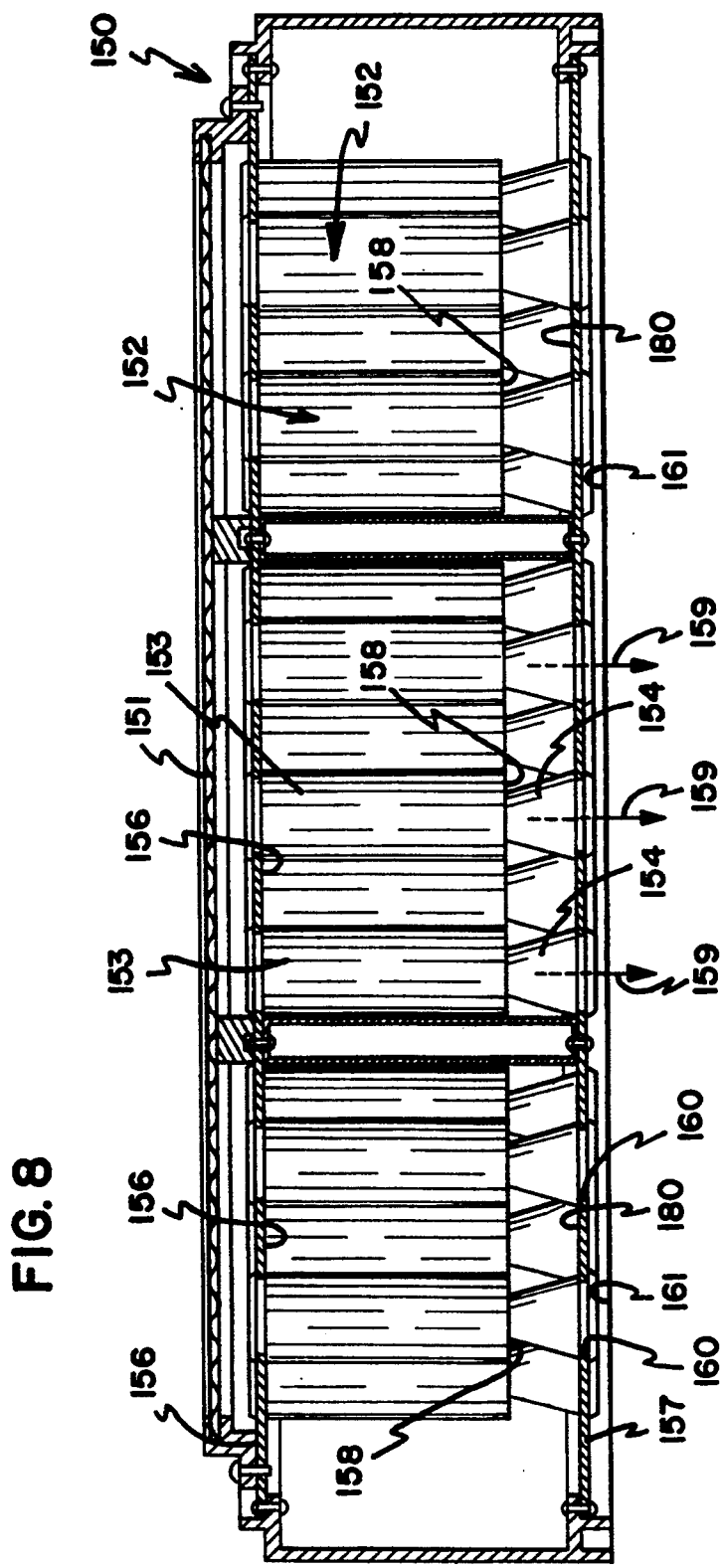
FIG. 8 is a cross-sectional view taken generally along line 8—8, FIG. 7.

Precleaner panel 150 includes upper wall 156 and lower wall 157. The first tubular member 153 of each centrifugal separator 152 is secured to the upper wall 156. The second lower tubular member 154, of each centrifugal separator 152, is generally secured to the lower wall 157. Referring to FIG. 8, as air is directed into the first tubular members 153, it is directed in a swirling pattern. As it moves in the swirling pattern, centrifugal force drives some of the particulates therein against the walls (interior surfaces) of first tubular members 153. Some of the particulate material suspended within the air stream will drop outwardly therefrom, through gaps 158, onto lower wall 157. Much of the air stream, on the other hand, passes along the direction shown by arrows 159, through holes 160, into the space 161 above the filter element housing 76. The particulate material resting on lower wall 157, will be scavenged therefrom along the direction indicated generally by arrows 162, FIG. 9, through outlet 163, under suction provided by the blower, not shown.

The operation of a scavenging draw from both the precleaner assembly 61 and the filter assembly 62 is understood by reference to FIG. 9. FIG. 9 is an enlarged fragmentary cross sectional view of a portion of the arrangement shown in FIGS. 4 and 5. An upper region 165 of one of the scavenging ducts 123, extending downwardly into filter element housing 76 is shown terminating, upwardly, at end 166. End 166 is engaged by flange 167 on precleaner assembly 61, with 0-ring gasket 168 therebetween, to form a seal upon downward pressure. Scavenge flow from scavenge duct 123 into outlet 163 is illustrated generally at arrow 177.

Vane 180 is positioned in volume 181. Vane 180 separates scavenge flow from precleaner assembly 61 from scavenge flow from filter assembly 62, until the two are mixed at end 185 of outlet 163. The position of vane 180, and shape thereof, is selectively set to provide preferential relative amounts of draws, by the scavenging blower, on the two volumes represented by the precleaner assembly 61 and filter assembly 62, respectively. Advantageous operation with respect to this, is described in detail below.

The presence of vane 180 in receptacle 82 is another one of the significant manners in which the assembly depicted in FIG. 9 differs from an assembly such as that depicted in FIGS. 7–10 of U.S. Pat. No. 4,242,115. For an arrangement such as depicted in '115 no analogous structure to the vane 180 is used, and there is no scavenging draw from the filter assembly. Rather the only scavenging draw in such arrangements is from the precleaner assembly. That is, arrangements such as '115 operate generally according to the schematic shown in FIG. 2, rather than the schematic shown in FIG. 3.

Similarly, the volume 181 is not "open" as shown in FIG. 9, for arrangements according to '115, but rather in arrangements according to '115 the volume is occupied by centrifugal separators. Alternately phrased, the preferred precleaner panel 150 utilized in arrangements according to the present is in many ways similar to the precleaning panel of '115, however one of the manners in which it differs is that several rows of centrifugal separators near end 186, i.e. adjacent exit 163, are absent, to allow for the positioning of vane 180.

Modifications to Facilitate Operation with a Conventional Blower

As indicated above, in general it was desired to achieve modifications of M1 tank filter arrangements such that much of the blower already in place, utilized with arrangements according to the schematic of FIG. 2, could be effectively utilized to both scavenge from the precleaner assembly 61 and scavenge from the filter assembly 62, as illustrated in the schematic of FIG. 3. It was desired that this be effected without having to increase the size of the blower or basic manner of its operation. This presented a significant problem, since the volume from which the blower would be drawing air, and the amount of particulate material carried, is increased significantly for the design of FIGS. 3–9, relative to the design of FIG. 2.

Herein the term "scavenge capacity" will be used to refer to the amount of air flow directed outwardly through outlet 163 and through the blower, as a percentage of the total amount of the ambient air flow which enters the air filter construction. In reference to FIG. 3, the scavenge capacity will refer to the amount of flow which exits through blower 55, as a percentage of the amount of air flow that enters inlet 48.

The scavenge capacity for the conventional M1 tank air cleaner system, from the precleaner alone, is engine speed dependent, with the maximum achievable typically being about 10%. As indicated above, in conventional systems the blower does not possess sufficient power, under all conditions, to provide good scavenging operation from the precleaner alone.

Such scavenge flow rates are relatively low, and the arrangement is specifically constructed to accommodate them. For example, as described above, preferably rounded centrifugal separators according to U.S. Pat. No. 4,746,340 are used to facilitate good separation with low scavenge flow.

In general, it has been found that if the scavenge flow is much lower than about 6%, the flow is insufficient to remove the dust from the precleaner alone. To obtain a scavenge flow much above about 10% a higher powered blower than found in conventional M1 tanks would be needed. Thus the air filter construction 60 according to the present invention, if conducted as a modification of existing M1 tank air filter constructions, would preferably need to be designed to effectively operate with a total of about 6-10% scavenge flow from both the precleaner and the filter arrangement i.e. a relative low scavenge capacity.

One of the modifications to facilitate operation under these parameters is achievement of modification in the precleaner assembly 61, to facilitate effective scavenge therefrom with lower flow. That is, whereas in the conventional system a 10% scavenge had been used for the precleaner alone (and without complete success), a challenge represented in the modifications was to have 6-10% scavenge flow be sufficient for both the precleaner and the air filter assembly. To help accomplish this objective, the conventional blower of the M1 tank was modified by changing its impeller and increasing impeller speed.

Efficient scavenging draw from filter assembly 62 is facilitated by the size, shape and porosity of the scavenging ducts positioned therein. This was generally discussed above.

In general, it is also desirable to define a relative amount of draw effected by the blower on the precleaner assembly 61 and the filter assembly 62. It has been found that this can be readily adjusted by the shape and positioning of vane 180, FIG. 9. In particular if a greater amount of draw from precleaner 61 relative to filter assembly 62 is desired, vane 180 can be positioned lower in volume 181, as for example indicated by phantom lines 190. In the alternative, for a greater amount of draw from filter assembly 62, relative to precleaner assembly 61, vane 180 can be adjusted to extend as indicated generally at phantom lines 191. From this it will be apparent that the amount of draw from the precleaner assembly 61 relative to the filter assembly 62, for scavenging, can be controlled by the relative amounts of cross-sectional area in region 181 dedicated to draw from these two positions. For preferred arrangements according to the present invention, and as illustrated in FIGS. 3-9, vane 180 should be positioned to allow for approximately twice the draw from precleaner 61 as from filter assembly 62.

Mechanism for Securing the V-Shaped Air Filters 90 in Position

As indicated above, preferred constructions according to the present invention include means for securing the V-shaped air filter packs 90 in position, within filter assembly 62. In particular, and referring to FIG. 5, it was explained that ends 93 of filter packs 90 include means 110 thereat for engagement around apertures 109. A secure seal at this location is provided by ensuring that, when filter assembly 62 is fully assembled, a substantial pressure is placed on the V-shaped filter packs 90 in the direction indicated generally arrows 200, FIGS. 5 and 10. Selective generation of this pressure is provided by means of filter pack locking assemblies or locking arrangements 210, FIG. 5. One locking arrangement 210 is provided in association with each V-shaped air filter pack 90.

Figure 12:
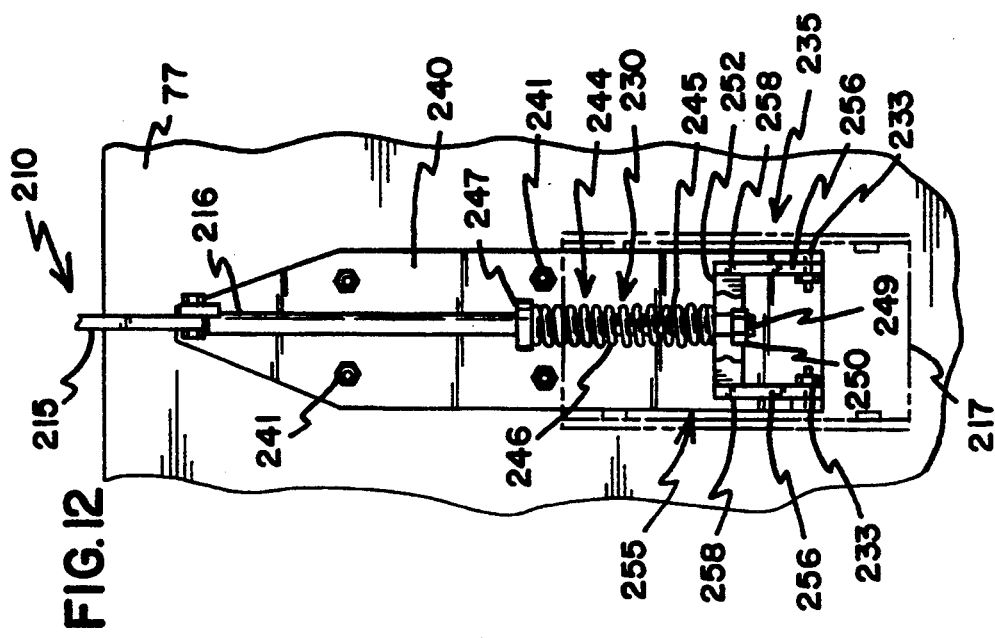
FIG. 12 is an enlarged fragmentary front view of the arrangement shown in FIGS. 10 and 11, with a portion illustrated in phantom.

Construction and operation of the locking arrangements will be understood, by reference to FIGS. 10-12.

In FIG. 10, a portion of the air filter assembly 62 is shown fragmentary, and in side elevation. In general, V-shaped air filter pack 90 is illustrated positioned within chamber 103 defined by sidewall 77. As indicated above, a secure air seal for the V-pack air filter pack 90, against apertures 109 (not shown in FIG. 10) can be provided by ensuring appropriate pressure in the direction of arrow 200, against end 92. Assembly 210 provides for selective application of this pressure.

In FIG. 10, assembly 210 is shown in an "unlocked" position. The term "unlocked" in this context is meant to refer to an operational arrangement of assembly 210 wherein locking pressure is not applied against a V-shaped air filter pack 90. Thus, for the arrangement shown in FIG. 10, sealing pressure is not provided against the V-shaped air filter pack 90, and the filter pack 90 can be readily removed from chamber 103.

Assembly 210 includes control handle 215, link 216 and pressure head 217. When control handle 215 is moved into a locking orientation, FIG. 11, a link mechanism including link 216 is pivoted to drive head 217 against face 92, providing pressure in the direction of arrow 200 on V-shaped air filter pack 90, as illustrated in FIG. 11. This will drive air filter 90 against a portion of the housing sidewall 77; to secure the air filter 90 in position.

Still referring to FIGS. 10 and 11, control handle 215 is secured within assembly 210 at pivot 220. Handle 215 includes extension or flange 221 therein, to which link 216 is connected by means of axle 223. It will be understood by reference to FIGS. 10 and 11, that axle 223 is positioned so that as handle 215 is moved between an unlocked orientation (FIG. 10) and a locked orientation (FIG. 11) axle 223 is moved between opposite sides (or over center) of pivot 220. By comparison of FIGS. 10 and 11, this, it will be understood, means that pressure directed along link 216 in the direction generally illustrated by double headed arrow 225, will act or operate to selectively maintain handle 215 in the locked orientation (when the handle 215 is swung down, FIG. 11). This effect is achieved by designing flange 221, and pivot points 220 and 223, such that a center line of link 216 is directed to the "backside", i.e. side of pivot 220 opposite end 226 of handle 215 when locking is desired, FIG. 11, but to the "front side", i.e. same side of pivot 220 as handle 215, FIG. 10, when unlocking is desired.

A spring-loaded pressure to ensure locking and pressure for seal is provided by a spring loaded system 230 supporting head 217. The spring-loaded support system 230 is described in greater detail hereinbelow, with respect to FIG. 12. In general, system 230 provides for a spring-loaded support of pressure head 217, to facilitate locking and unlocking, FIGS. 10 and 11.

Still referring to FIGS. 10 and 11, to ensure appropriate operation of the link system reflected by locking arrangement 210, an anchor point 233 is provided secured to wall 77, below pivot point 220. A link system 235, FIGS. 10 and 11, is secured to anchor point 233, for controlled movement of head 217. Link system 235 is illustrated in greater detail, in FIG. 12.

Referring to FIG. 12, a front elevational view of the arrangement shown in FIGS. 10 and 11 is presented. In FIG. 12, locking arrangement 210 is shown in an unlocked position (analogous to FIG. 10) with the pressure head 217 shown in phantom, to facilitate viewing selected portions of the assembly. From FIG. 12, it will be understood that assembly 210 includes a mounting plate 240 by which assembly 210 can be secured to side wall 77. Means for securement are illustrated in FIG. 12 as bolts 241.

Referring to FIG. 12, link 216 includes an extension 244 thereon which comprises a rod 245 threaded through spring 246. Shoulder 247 positioned on link 216 control the precise positioning of spring 246. End 249 of rod 245 includes stop 250 thereon, to retain the spring 246 in position.

Crosslink 252 is mounted on rod 245, by extension of a portion of rod 245 therethrough, with stop 250 ensuring that the connection is maintained. It will be understood that crosslink 252, "floats" on stop 250, under pressure provided by spring 246. That is, spring 246 is compressed between shoulder 247 and crosslink 252.

Link system 235 includes a yoke 255 defined by crosslink 252 and side links 256. Each sidelink is pivotally secured to the crosslink 252 at pivot points 258. The side links 256 are pivotally secured to mounting plate 240 (and thus wall 77) at pivot points 233.

As will be understood by reference to FIGS. 10 and 11, the net result is that as link 216 is pivoted by movement of handle 215 about 220, the pressure head 217 is thrust forward, i.e. in the direction of arrow 200. The various links are sized and configured so that when handle 215 is moved sufficiently far to push link 216 "over center" with respect to pivot point 220, sufficient pressure is provided by head 217 on end cap 92, to provide a sealing pressure (in the direction of arrow 200) at the opposite end, not shown, of the V-shaped filter pack 90. The pressure will also serve to lock the handle 215 in position. Referring to FIGS. 10-12, head 217 includes a plurality of rollers 259 thereon, oriented to engage end cap 92, during sealing. The rollers 259 facilitate operation.

The Pulse Jet Tank and Valve Arrangement.

Figure 13:
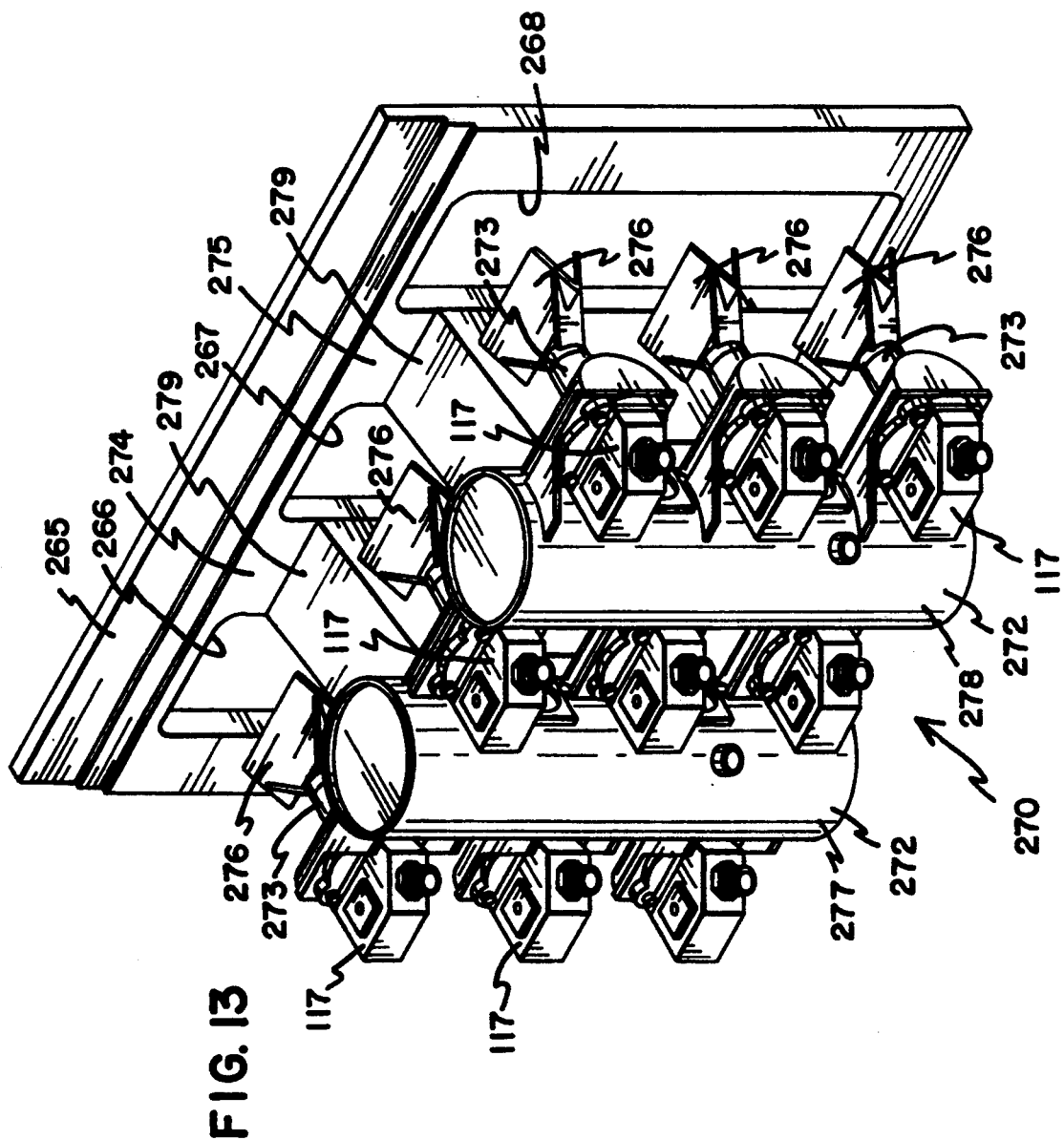
FIG. 13 is an enlarged fragmentary perspective view of portion of the arrangement shown in FIGS. 4 and 5.

In FIG. 13, a pulse jet tank and valve arrangement, for utilization with assemblies according to the present invention, is provided. FIG. 13 is a fragmentary view of a portion of the assembly shown in FIGS. 4 and 5. Referring to FIG. 13, at 265 an end wall of the housing 76 is depicted. End wall 265 is the end wall, FIGS. 4 and 5, through which air passes, as it is directed into the clean air plenum 70.

Referring to FIG. 13, passage through wall 265 of airflow, into the clean air plenum, from the three V-shaped air filter packs, occurs through airflow apertures 266, 267 and 268 respectively.

Still referring to FIG. 13, assembly 270 is mounted on or adjacent wall 265 by bracket arrangement 271, in the clean air plenum 70. Preferably at least one of apertures 266, 267 and 268 is sized, relative to the tank portion of assembly 270, such that the tank portion of assembly 270 can be installed by passage through one of the apertures, from the inside of housing 76. Such a construction facilitates installation of assembly 270 in existing M1 tanks, without substantial disassembly.

Assembly 270 includes a tank portion or container system 272 for holding compressed gasses (for example compressed air) therein. Assembly 270 also includes nine pulse jet valves 117 thereon, appropriately oriented to direct pulses of air into the various chambers, the various air filters, described above with respect to FIGS. 4 and 5. Each valve 117 includes, associated therewith, a pulse jet conduit 273, oriented to direct the jet pulses of compressed gas through apertures 266, 267 and 268, and into container 76. The conduits are preferably provided with air flow splitters 276 (FIG. 4) to facilitate spread of air flow. The use of splitters in a pulse jet system is generally described in U.S. Pat. No. 4,452,616.

Wall 265 generally includes vertical sections 274 and 275 therein. Section 274 separates apertures 266 and 267; while section 275 separates apertures 267 and 268. Assembly 270 is preferably configured with first and second vertical chambers 277 and 278 therein. Vertical chamber 277 is configured to align with section 274; and, vertical chamber 278 is configured to align section 275. This presents a significant portion of container 271 behind portions of wall 265, so as to lessen the amount of blockage to airflow through aperture 266 provided by assembly 270. That is, while the valve arrangements 117 are positioned aligned with apertures 266, 267 and 268, at least major storage volumes 277 and 278, with the compressed gas, do not align with these apertures and thus do not block airflow therethrough. It is foreseen that various portions of assembly 270 can be designed with smooth airflow surfaces thereon, to facilitate passage of air through apertures 266, 267 and 268, through the clean air plenum 70 into the engine. Spacers 279 mount assembly 270 to sections 274 and 275.

An Alternate Pulse Jet Tank and Valve Arrangement

Figure 14:
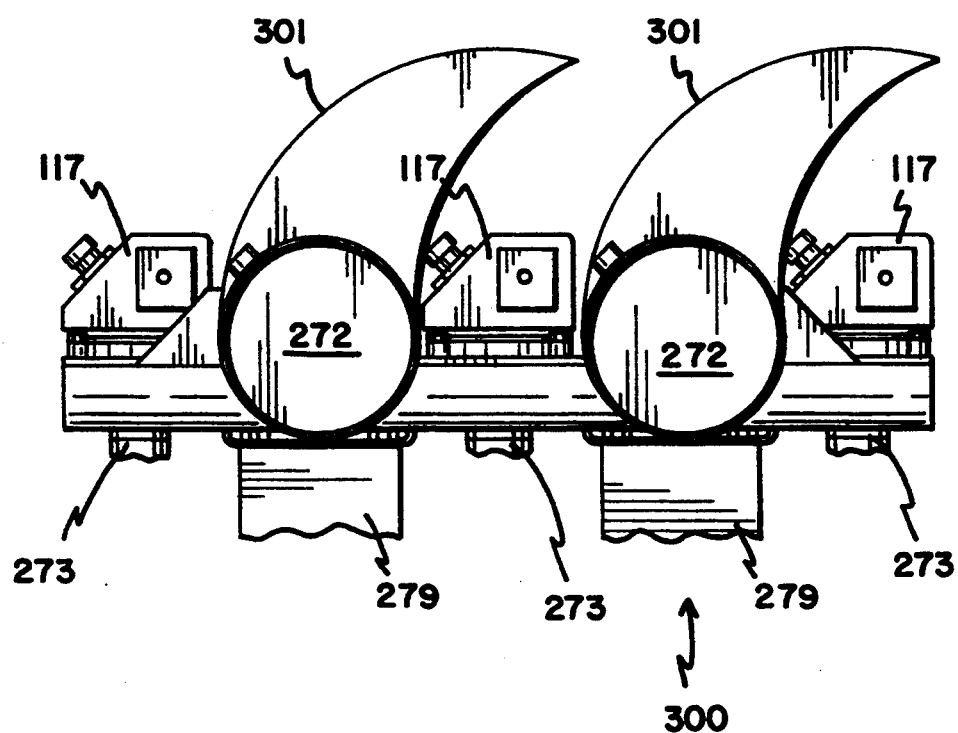
FIG. 14 is a fragmentary top plan view of an alternate embodiment of the component depicted in FIG. 13.

An alternate pulse jet tank and valve arrangement is indicated in FIG. 14, at 300. Arrangement 300 is configured with air direction flanges 301 thereon, to facilitate air flow direction toward the outlet (see FIG. 5) of air flow to the turbine. In other manners arrangement 300 of FIG. 14 may be analogous to assembly 270, FIG. 13.

Preferred Logic for Control Pulse Jet Air Cleaners

A principal object of the cleaning logic is to activate the pulse cleaning system when necessary in order to control primary restriction, i.e. restriction to air flow through the air filters. However, an appropriate cleaning logic also prevents unnecessary cleaning. This is accomplished by two basic modes of cleaning: high and low. In either mode, cleaning is avoided when engine speed is too low to provide adequate cleaning. Engine speed therefore should be used as an input to the pulse jet air cleaner controller. That is, below a lowest selected point of engine speed, the cleaning should not be activated.

The low cleaning mode is intended for either low to moderate dust conditions, or moderate engine speeds. Low cleaning is based on run time only. For example, every 20 minutes the pulse system would be activated, with three cleaning cycles performed (three pulses of all nine valves). This would only be conducted if the engine speed was above a selected set point. The cleaning mode would continue as long as the primary restriction is maintained below the high clean restriction limit.

If the primary restriction hits the selected "high clean restriction limit", the high clean mode would be activated. This would occur, for example, in very dusty conditions such as desert conditions. In an example of a high clean mode, six cleaning cycles are set for cleaning when the high restriction limit is exceeded. The cleaning resets to six cleaning cycles as long as the high restriction limit is exceeded when the primary restriction goes below the high restriction limit, the controller begins the count of the first six cleaning cycles. This completes that high cleaning mode (unless the high restriction limit is again exceeded). If the primary restriction is then below the restriction limit, the system goes back to the low clean mode, wherein the pulse jets are activated at a selected run time. The system would continue in low clean mode until the high clean restriction limit was again reached.

For each cycle, cleaning is enhanced if the jet sequence is operated sequentially from top to bottom.

In general, a pulse jet of about one standard cubic foot of air delivered in about 100 milliseconds will be sufficient to achieve useful operation, where the filter elements are conventional elements utilized in the M1 tank.

It will be understood that the embodiments disclosed herein are exemplary of the principles of the present invention in the manners in which they may be applied. The invention, however, is not to be interpreted as limited to the specific embodiments or arrangements of parts herein described and shown.

What is claimed is:

1. An air cleaner construction comprising:
   (a) a precleaner arrangement constructed and arranged for direction of air flow therethrough and selected separation of particulate material from air flow directed therethrough before the air flow is directed outwardly from said precleaner arrangement;
   (b) a filter assembly constructed and arranged to receive selected air flow from said precleaner arrangement and to direct same through a filter arrangement;
      (i) said filter assembly including at least two filter packs therein; said at least two filter packs comprising a first filter pack and a second filter pack separated by an intermediate wall panel;
   (c) a scavenger arrangement constructed and arranged to selectively withdraw separated particulate material from both of said precleaner arrangement and said filter assembly; said scavenger arrangement including:
      (i) at least one perforated scavenger duct having scavenge apertures oriented to collect particulate material from a space between said first filter pack and said intermediate wall panel; and,
      (ii) at least one perforated scavenger duct having scavenge apertures oriented to collect particulate material from a space between said second filter pack and said intermediate wall panel.

2. A construction according to claim 1 wherein:
   (a) said first filter pack comprises first and second pleated paper filter panels having a clean air space therebetween; and,
   (b) said air filter arrangement includes a pulse jet cleaner assembly constructed and arranged to selectively direct a pulse of gas into said clean air space between said first and second pleated paper filter panels in said first filter pack.

3. A construction according to claim 1 wherein:
   (a) said first filter pack comprises first and second pleated paper filter panels having a clean air space therebetween;
      (i) sid clean air space in said first filterpack being divided into at least first and second vertically disposed chambers; and,
   (b) said air filter arrangement includes a pulse jet cleaner assembly constructed and arranged to selectively direct:
      (i) a first pulse of gas into said first chamber of said clean air space and through said first filter pack in a direction opposite to flow therethrough of air to be filtered; and,
      (ii) a second pulse of gas into said second chamber of said clean air space and through said first filter pack in a direction opposite to flow therethrough of air to be filtered.

4. A construction according to claim 1 wherein:
   (a) said filter arrangement includes a housing having sidewalls; said filter pack being positioned within said housing; and,
   (b) wherein said air cleaner construction includes a filter pack locking assembly constructed and arranged to secure said first filter pack against one of said housing sidewalls by selectively applying pressure against said first filter pack.

5. A construction according to claim 4 wherein:
   (a) said filter pack locking assembly comprises a link mechanism and pressure plate construction secured to one of said housing sidewall and including an over center control arm arrangement.

6. A construction according to claim 1 wherein:
   (a) said precleaner arrangement comprises a plurality of centrifugal separators constructed and arranged for selected separation of particulate material from an air flow stream directed therethrough.

7. A construction according to claim 1 wherein:
   (a) said scavenger arrangement includes a perforated scavenger duct having:
      (i) a first set of scavenge apertures therein oriented to collect particulate material from a space between said first filter pack and said intermediate wall panel; and, a second set of scavenge apertures oriented to collect particulate material from a space between said second filter pack and said intermediate wall panel.

8. A construction according to claim 7 including:
   (a) a pulse jet cleaner assembly constructed and arranged to selectively direct:
      (i) a first pulse of gas through said first filter pack in a direction opposite to flow through said first filter pack of air to be filtered; and,
      (ii) a second pulse of gas through said second filter pack in a direction opposite to flow through said second filter pack of air to be filtered.

* * * * *

UNITED STATES PATENT AND TRADEMARK OFFICE
CERTIFICATE OF CORRECTION

PATENT NO. : 5,401,285
DATED : March 28, 1995
INVENTOR(S) : Gillingham et al.

It is certified that error appears in the above-indentified patent and that said Letters Patent is hereby corrected as shown below:

Column 4, line 16, after "of" insert --a--.

Column 9, line 4, after "123", insert --that--.

Column 10, line 67, after "described." delete "I".

Column 11, line 37, after numeral "152" delete "is".

Column 15, line 42, after "The" delete "10".

Column 16, line 28, after "align" insert --with--.

In claim 3 at column 18, line 13, delete "sid" and insert therefor --said--.

In claim 5 at column 18, line 39, delete "sidewall" and insert therefor --sidewalls--.

Signed and Sealed this

Twenty-eighth Day of November 1995

Attest:

BRUCE LEHMAN

*Attesting Officer*   *Commissioner of Patents and Trademarks*